Aug. 23, 1966  J. WALLEN, JR  3,268,856
GUN BLAST DETECTOR
Filed Oct. 23, 1963
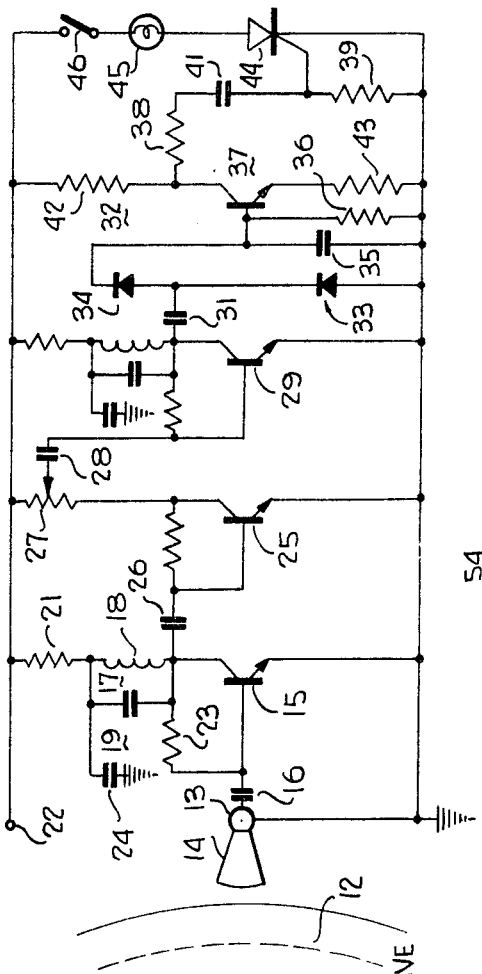
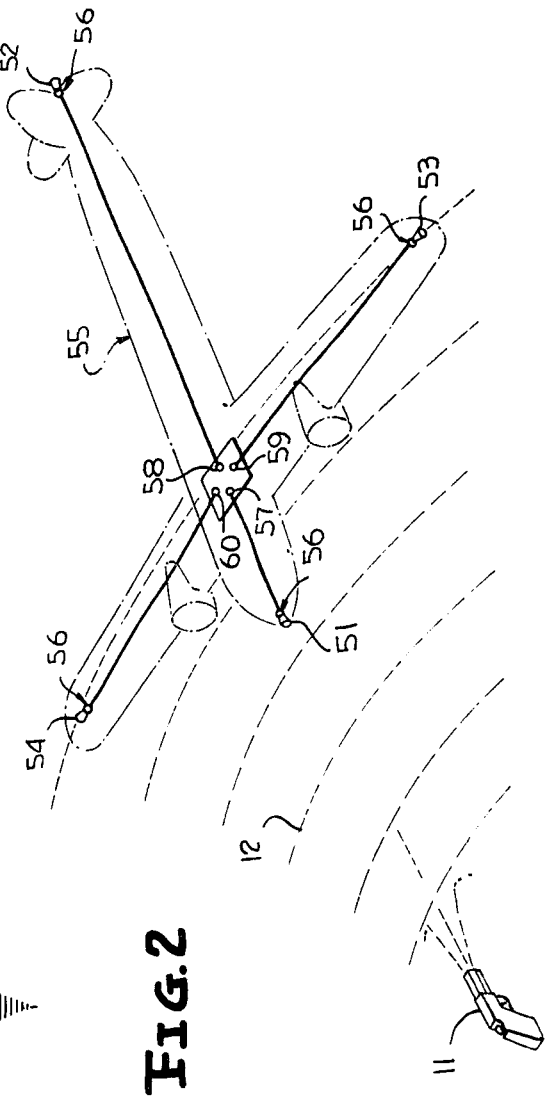
INVENTOR
JAMES WALLEN, JR.
BY *Hurvitz & Rose*
ATTORNEYS

United States Patent Office 3,268,856
Patented August 23, 1966

3,268,856
GUN BLAST DETECTOR
James Wallen, Jr., Falls Church, Va., assignor to Melpar, Inc., Falls Church, Va., a corporation of Delaware
Filed Oct. 23, 1963, Ser. No. 318,224
6 Claims. (Cl. 340—15)

The present invention relates to detecting the shock wave of a gun blast and more particularly to a method and apparatus for indicating a gun blast in response to the ultrasonic pressure wave deriving from the blast.

In a noisy environment, e.g. in the cockpit of a helicopter or a subsonic fixed wing aircraft, audio detection of a gun blast by the human ear or instrumentation is frequently impossible. In such an environment, the gun blast audio spectrum usually is coincident with the spectrum of ambient noise sources, i.e. between 50 and 5000 cycles per second, and the audio pressure wave deriving from the blast is often not sufficiently great to enable it to be distinguished from the noise. A further problem arising with mechanical gun blast detectors responsive to the audio spectrum is their frequent inability to separate pressure waves caused by wind from those of the gun blast. Also, an audio detection system requires an acoustic horn of considerable dimensions if it is to be utilized for direction finding purposes. Even a very large horn, however, usually does not have the requisite highly directional pattern necessary for accurate direction finding purposes.

I have found that the blast from guns, such as small arms utilized by the military, creates a shock wave having a leading edge with a considerable supersonic spectrum, i.e. 20,000 to 100,000 c.p.s. By detecting the ultrasonic spectrum, it is possible to avoid all of the aforementioned disadvantages attendant with audio gun blast detection systems. The use of the short wavelength ultrasonic energy for direction finding purposes is desirable because ultrasonic, highly directional horns having small physical dimensions are easily attained. By directing such a horn away from ultrasonic noise sources on a helicopter or a fixed wing aircraft, i.e. the rotor and propeller, respectively, it is possible to completely decouple energy from such sources from the transducer at the end of the horn. Of course, any sonic noise sources that might be on the craft, or in its vicinity can be easily distinguished because their spectra are far removed from the gun blast ultrasonic spectrum.

It is accordingly an object of the present invention to provide a new and improved gun blast detection system and method.

Another object of the invention is to provide a gun blast detection system and method adapted to operate in noisy environments, such as helicopters and subsonic fixed wing aircraft.

A further object is to provide a method and apparatus for detecting gun blasts, which method and apparatus is adapted to have highly directional characteristics.

An additional object is to provide an apparatus for detecting gun blasts in response to the ultrasonic pressure wave deriving from the blast.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram of a preferred embodiment of the invention; and

FIGURE 2 is an illustration of how plural ultrasonic detectors are utilized to determine the direction from which a gun blast originated.

Reference is now made to FIGURE 1 of the drawing wherein the reference numeral 11 indicates a small arm that has just been fired. In response to the leading edge of the blast deriving from gun 11, there is produced an ultrasonic (20–100 kc.) pressure wave 12, in addition to the well known audio signature.

Wave 12 is coupled to ultrasonic microphone 13 located at the end of horn 14, dimensioned to have highly directional characteristics. Microphone 13 converts pressure wave 12 into an electric signal that is coupled to the base of common emitter NPN transistor 15 via capacitor 16.

Transistor 15 has its collector connected through tuned load 17 comprising inductance 18 and capacitor 19, and resistor 21 to positive terminal 22 of the circuit power supply. To supply D.C. biasing potential to the base of transistor 15, collector to base negative feedback resistor 23 and filter capacitor 24, connected between inductance 18 and resistor 21, are provided. The amplified signal at the collector of transistor 15 is fed via coupling capacitor 26 to the base of the isolating, variable gain stage, comprising common emitter NPN transistor 25. D.C. stabilization for transistor 25 is attained by resistor 26, connected between its base and collector.

Potentiometer 27, which adjusts the amplifier gain, hence the level at which system is activated, is provided between the collector of transistor 25 and terminal 22. The slider of potentiometer 27 is A.C. coupled via capacitor 28 to the base of a further tuned amplifier stage comprising transistor 29. The circuitry associated with transistor 29 is substantially identical to that of transistor 15. Both circuits are amplifiers tuned to the same ultrasonic frequency, approximately 40 kc. and together have a narrow band pass of 2 kc. With such an arrangement, audio frequencies are severely attenuated while a large percentage of ultrasonic energy from the blast is amplified.

The ultrasonic signal at the collector of transistor 29 is A.C. coupled via capacitor 31 to amplitude modulation detector 32. Detector 32 includes a voltage doubling rectifier comprising shunt and series diodes 33 and 34, which rectifier passes the full amplitude of the ultrasonic wave deriving from transistor 29 to the parallel combination of capacitor 35 and resistor 36. In response to ultrasonic shock wave 12 from gun 11, the amplifier comprising transistors 15, 25 and 29 derives a positive voltage at the junction between the cathode and anode of diodes 33 and 34 of sufficient magnitude to cause the base of NPN transistor 37 to be suddenly driven into heavy conduction.

Previously, transistor 37 was cut off or conducting weakly so virtually no current was flowing in the series path comprising resistors 38, 39 and capacitor 41, shunting the transistor collector to ground. Collector current for transistor 37 is supplied from terminal 22 through load resistor 42, while base emitter bias is provided by resistance 43, in the emitter circuit. When a large positive voltage is suddenly supplied to the base of transistor 37 by detector 32, capacitor 41 discharges through the transistor. After the ultrasonic signal disappears capacitor 35 discharges and transistor 37 is again turned off resulting in a positive going signal at the collector of transistor 37. Thereby, the ungrounded end of resistor 39 and the control electrode of silicon controlled rectifier 44 become considerably positive.

Rectifier 44, having its anode connected through the filament of lamp 45 and switch 46 to terminal 22, is thus activated from its previously cut off condition into hard conduction. Conduction of SCR 44 causes lamp 45 to be energized to provide a visual indication of blast occurrence. Due to the nature of SCR 44, lamp 45 remains energized, even after the voltage across resistor 39 becomes nil. When a human operator becomes aware of lamp 45 being lit, he opens switch 46 to extinguish current flow through SCR 44 and lamp 45. Reclosing switch 46 enables the system to detect once again another blast from gun 11.

It is to be realized that the slider of potentiometer 27 is adjusted so ultrasonic energy of lower intensity than a blast from gun 11 does not cause the amplitude responsive trigger comprising SCR 44 to be activated. Also, an audio indicator may be substituted for, or added to, visual indicator 45.

Reference is now made to FIGURE 2 of the drawings wherein highly directional ultrasonic horns 51-54 are directed to pick up energy emanating from gun blasts at the front, rear and sides of aircraft 55. At the end of each horn away from its aperture, there is positioned an ultrasonic microphone 56, the output of which feeds a separate detection circuit of the type illustrated in FIGURE 1. The horns are positioned and dimensioned so that virtually no ultrasonic energy from the airplane propellers is coupled to the microphones at their ends and each detection circuit is responsive only to ultrasonic energy in the area in front of the aperture of the horn to which it is responsive. The output of each detection circuit is supplied to one of four indicator lamps 57-60. If a gun blast occurs ahead of the aircraft nose, a sufficiently large ultrasonic signal is coupled by horn 51 to microphone 56 to enable energization of lamp 57. Because horns 52, 53 and 54 are highly directional there is virtually no ultrasonic energy fed to the microphones at their ends and lamps 58-60 remain deenergized. Thus, by observing which lamps or pair of lamps are activated, it is possible to determine the direction of the blast within 45° with only four microphones.

While I have described and illustrated one specific embodiment of my invention, it will be clear that variations of the details of construction which are specifically illustrated and described may be resorted to without departing from the true spirit and scope of the invention as defined in the appended claims.

I claim:

1. A method for indicating the occurrence of a gun blast in the presence of ambient acoustical noise, comprising the step of detecting the ultrasonic energy in the shock wave of the gun blast.

2. The method according to claim 1 further including the step of converting the detected ultrasonic energy to a form for indicating the existence of the blast.

3. Apparatus for indicating the occurrence of a gun blast in the presence of ambient acoustical noise, comprising means for converting ultrasonic energy into an electrical signal of corresponding frequency, means responsive to ultrasonic energy in the shock wave of said blast for supplying said energy to said converting means, indicating means, and means responsive to said electrical signal from said converting means for energizing said indicating means, said means for energizing including means responsive to electrical signal of predetermined amplitude for maintaining said indicating means energized despite subsequent reduction in signal amplitude from said predetermined amplitude.

4. The combination according to claim 3 further including switch means for de-energizing said indicating means.

5. Apparatus for indicating the occurrence of a gun blast and the direction from which said gun blast emanated, in the presence of ambient acoustical noise, comprising an array of directional transducers each positioned for receiving ultrasonic vibrations in the shock wave of a gun blast emanating from a distinct and different direction and for converting the received ultrasonic vibrations to electrical signal of amplitude and frequency proportional thereto, a plurality of indicating means each associated with a respective one of said transducers, and a plurality of means each responsive to electrical signals derived from a respective one of said transducers for energizing the respective one of said indicating means, so that the energization of any one of the indicating means constitutes an indication of the direction from which the gun blast emanated.

6. The combination according to claim 5 wherein each of said directional transducers comprises an ultrasonic directional horn.

References Cited by the Examiner

UNITED STATES PATENTS

| 2,461,344 | 2/1949 | Olson | 179—1 |
|---|---|---|---|
| 2,812,032 | 11/1957 | Kock | 181—5 |
| 3,176,263 | 3/1965 | Douglas | 340—16 |
| 3,182,489 | 5/1965 | Hamilton | 73—67 |
| 3,192,507 | 6/1965 | Sudges | 340—171 |

BENJAMIN A. BORCHELT, *Primary Examiner.*

P. A. SHANLEY, *Assistant Examiner.*